United States Patent [19]

Aerts

[11] Patent Number: 4,551,492
[45] Date of Patent: Nov. 5, 1985

[54] POLYESTER COATING COMPOSITION

[75] Inventor: Armand Aerts, Bekkevoort, Belgium

[73] Assignee: E. I. Du Pont de Nemours and Company, Wilmington, Del.

[21] Appl. No.: 686,916

[22] Filed: Dec. 27, 1984

[51] Int. Cl.$^4$ .......................... C08L 1/14; C08L 67/08
[52] U.S. Cl. ........................................ 524/40; 524/39; 524/275; 524/315; 525/163; 525/164; 525/176; 525/443
[58] Field of Search ............... 524/38, 39, 40, 275, 524/315; 525/163, 164, 443, 176

[56] References Cited

U.S. PATENT DOCUMENTS

| | | | |
|---|---|---|---|
| 2,423,823 | 7/1947 | Baker | 524/39 |
| 3,265,645 | 8/1966 | Coney et al. | 524/39 |
| 3,790,513 | 2/1974 | Victorius | 525/163 |
| 3,846,368 | 11/1974 | Pettit, Jr. | 525/176 |
| 3,862,063 | 1/1975 | Pettit, Jr. | 524/40 |
| 3,922,447 | 11/1975 | Isaksen et al. | 525/163 |
| 4,168,249 | 9/1979 | Meyer | 524/40 |
| 4,193,897 | 3/1980 | Wingler et al. | 524/40 |
| 4,222,926 | 9/1980 | Mizuno et al. | 525/176 |
| 4,238,583 | 12/1980 | Tobias et al. | 525/443 |
| 4,430,368 | 2/1984 | Garland et al. | 525/443 |
| 4,451,597 | 5/1984 | Victorius | 524/40 |
| 4,482,609 | 11/1984 | Woodhouse | 525/166 |

FOREIGN PATENT DOCUMENTS

| | | | |
|---|---|---|---|
| 0061628 | 6/1978 | Japan | 525/163 |
| 0174366 | 10/1982 | Japan | 524/40 |

*Primary Examiner*—John Kight
*Assistant Examiner*—Nathan M. Nutter

[57] ABSTRACT

A polyester composition in organic solvents with about 40% polyester, 26% melamine crosslinker and 16% cellulose acetate butyrate provides a coating composition with 18% binder solids.

3 Claims, No Drawings

POLYESTER COATING COMPOSITION

BACKGROUND

Solvent-based coating compositions containing polyesters, melamine crosslinkers, plasticizers, wax dispersions and cellulose acetate butyrate resins have been available at 14% binder solids levels.

It is desirable to be able to increase binder solids to the 18% level to decrease the expense of the solvents, the heat needed to evaporate them, and the air pollution effects of the evaporated solvents.

SUMMARY OF THE INVENTION

The present invention provides a coating composition consisting essentially, in percent by weight based on the binder, of a binder consisting essentially of about 37.5–40% polyester resin having a Tg above 30° C., 24.5–26% partially butylated melamine crosslinker resin, 6–10% polyurea plasticizer, 8% polyethylene vinyl acetate copolymer wax dispersion, 16% of a mixture of two cellulose acetate butyrate resins having different ranges of molecular weight as indicated by Ford Cup viscosities in solution in butyl acetate, including 30–50% of a first cellulose butyrate acetate resin having such a molecular weight indication of about 2 seconds and 50–70% of a second such resin having such a molecular weight indication of about 20 seconds, plus optionally pigments and extenders, said binder with any pigments and extenders being dispersed in liquid media comprising organic solvents at a binder solids content of about 18% by weight.

Preferably, pigments are used at pigment-to-binder ratios in the range of 5–25 units of pigments to 100 units of binder. With high metallic pigmentation, a ratio of 25:100 is preferred; with low metallic concentrations, a ratio of 5:100 is preferred.

DETAILED DISCLOSURE

To increase the solids content of polyester coating compositions which are the subject of the invention, the amount of cellulose acetate butyrate resin has been decreased and the amount of polyester resin plus melamine crosslinker has been increased with more crosslinker being used relative to polyester resin.

In the following example and comparative test, parts, percentages and proportions are by weight except where indicated otherwise. The components indicated provide the resin solids, and they are formulated with amounts of suitable fast and slow solvents to achieve the indicated resin solids contents. The solvent blends added to the indicated components are preferably 50% each of butyl acetate and high boiling aromatic hydrocarbons, such as a blend of 9 parts Solvesso 100 (Exxon) and 1 part Solvesso 150. The resins are blended together. Although the order of addition is not critical, preferably the resins are added in the order indicated. Tg means glass transition temperature.

COMPARATIVE TEST

| Component (Supplier) | Amount |
| --- | --- |
| Polyester resin Tg 40° C. at 50% solids in 50-50 butyl acetate xylene Dynapol H700 (Dynamit Nobel) | 42 |
| Melamine crosslinker resin - partially butylated at 55% solids in butanol Maprenal MF650 (Hoechst) | 18 |
| Polyurea plasticizer - carbamic acid ester from butylurethane and formaldehyde Resamine HF450 (Hoechst) | 10 |
| 85% Polyethylene - 15% vinyl acetate copolymer, as a wax dispersion in 50 xylene - 50 butyl acetate AC405 (Allied Chemical) | 8 |
| 2 sec Cellulose acetate butyrate Cellit BP700 (Bayer) | 11 |
| 20 sec Cellulose acetate butyrate Cellit BP900 (Bayer) | 11 |

The formulation of this comparative test produced satisfactory paint at 14% binder solids but not at the higher and more desirable level of 18%. It was applied to automobiles using conventional spraying and curing techniques.

EXAMPLE

| Component (Supplier) | Amount |
| --- | --- |
| Polyester resin Tg 40° C. at 50% solids in 50-50 butyl acetate xylene Dynapol H700 (Dynamit Nobel) | 39.6 |
| Melamine crosslinker resin - partially butylated at 55% solids in butanol Maprenal MF650 (Hoechst) | 26.4 |
| Polyurea plasticizer - carbamic acid ester from butylurethane and formaldehyde Resamine HF450 (Hoechst) | 10 |
| 85% Polyethylene - 15% vinyl acetate copolymer, as a wax dispersion in 50 xylene - 50 butyl acetate AC405 (Allied Chemical) | 8 |
| 2 sec Cellulose acetate butyrate Cellit BP700 (Bayer) | 8 |
| 20 sec Cellulose acetate butyrate Cellit BP900 (Bayer) | 8 |

With ordinary pigmentation the resin formulation of this example at 18% binder solids produces desirable automotive paint by spraying and curing.

I claim:

1. A coating composition consisting essentially, in percent by weight based on the binder, of a binder consisting essentially of about
   37.5–40% polyester resin having a Tg above 30° C.,
   24.5–26% partially butylated melamine crosslinker resin,
   6–10% polyurea plasticizer,
   8% polyethylene vinyl acetate copolymer wax dispersion,
   16% of a mixture of two cellulose acetate butyrate resins having different ranges of molecular weight, as indicated by Ford Cup viscosities in solution in butyl acetate, including 30–50% of a first cellulose butyrate acetate resin having such a molecular weight indication of about 2 seconds and 50–70% of a second such resin having such a molecular weight indication of about 20 seconds,
   plus optionally pigments and extenders, said binder with any pigments and extenders being dispersed in a liquid media comprising organic solvents at a binder solids content of about 18% by weight.

2. A coating composition of claim 1 having a pigment-to-binder weight ratio in the range of about 5–25 units of pigment per 100 units of binder.

3. A coating composition of claim 2 having a pigment-to-binder weight ratio of about 25:100.

* * * * *